United States Patent [19]
Beauchesne

[11] Patent Number: 6,128,626
[45] Date of Patent: Oct. 3, 2000

[54] METHOD FOR MINIMIZING STORAGE REQUIREMENTS FOR PRODUCTION ASSEMBLY INFORMATION AND UPDATES

[75] Inventor: Robert C. Beauchesne, Brockton, Mass.

[73] Assignee: Bull HN Information Systems Inc., Billerica, Mass.

[21] Appl. No.: 09/109,118

[22] Filed: Jun. 30, 1998

[51] Int. Cl.[7] .................................................. G06F 17/30
[52] U.S. Cl. ........................... 707/104; 707/200; 707/10; 700/97
[58] Field of Search .................................. 707/104, 200, 707/10; 700/97

[56] References Cited

U.S. PATENT DOCUMENTS

| | | | |
|---|---|---|---|
| 5,499,365 | 3/1996 | Anderson et al. | 707/1 |
| 5,777,876 | 7/1998 | Beauchesne | 700/95 |
| 5,864,875 | 1/1999 | Van Huben et al. | 707/200 |

OTHER PUBLICATIONS

Product Overview of MM Materials Management, Efficient Procurement Processes as the Basis for Goal–Oriented Purchasing and Warehouse Management, pp. 1–4 from SAP Headquarters; SAP AG (Internet), no date.

SAP R/3 Materials Management, SAP E–Business Solutions, pp. 1–2 (Internet), no date.

*Primary Examiner*—Thomas G. Black
*Assistant Examiner*—Diane D. Mizrahi
*Attorney, Agent, or Firm*—Faith F. Driscoll; John S. Solakian

[57] ABSTRACT

A method and database organization for use by a plurality of client systems wherein a database contains a plurality of table structures for storing a product directory index and a minimum number of product related information entries utilized in generating a bill of materials document for a particular user designated customer product. The system also includes a selection menu facility component and a data selection component, both of which operatively couple to the database. The selection menu facility component enables an operator to access the product directory index for obtaining a number of key information values pertaining to a particular printed circuit board assembly. These values are utilized by the data selection component in searching and extracting from the database tables as a function of the states of predefined key values contained in the table entries, all of the pertinent information entries needed to generate/display a bill of materials document based on information generated in response to an operator selection.

30 Claims, 21 Drawing Sheets

| \multicolumn{2}{l}{INFORMATION REQUIREMENTS FOR PLACING A SINGLE DEVICE ONTO A PRINTED CIRCUIT BOARD} | |
|---|---|---|
| ITEM | EXAMPLE | DESCRIPTION |
| CUSTOMER PART # | BC121-0149 | NUMBER USED BY THE CUSTOMER TO DEFINE THIS PART FROM ANY OTHER PART NUMBER. THIS IS USED AS THE COMMON DENOMINATOR FOR ALL TABLE INFORMATION. |
| DESCRIPTION | IC 74S74 | PROVIDES A DESCRIPTION OF THE DEVICE IN TERMS THAT AN INDIVIDUAL ASSOCIATED WITH ELECTRONIC ASSEMBLY MIGHT UNDERSTAND. THE TERM IS USUALLY GENERIC. |
| LOCATION | U1 | THIS IS THE LOCATION ON THE ASSEMBLY WHERE THE DEVICE IS TO BE MOUNTED. TOPOGRAPHICAL REFERENCE METHODS TYPICALLY FOLLOW A CONVENTION BUT NOT A STANDARD. |
| VENDOR | TI | DEFINES THE MANUFACTURER OF THE DEVICE, OR THE ORGANIZATION FROM WHOM THE MATERIAL CAN BE PURCHASED. |
| VENDOR PART NUMBER | TI74S74B | DEFINES THE NUMBER USED BY THE VENDOR OF THE COMPONENT TO IDENTIFY THE DEVICE. THESE DEVICE NUMBERS TYPICALLY DIFFER FOR EACH VENDOR. |
| QUANTITY USED | 1 | THIS INFORMATION NEED NOT RESIDE AS A SEPARATE ENTITY IN THE DATA BASE BUT MAY BE DERIVED SIMPLY BY COUNTING SIMILAR COMPONENT PART NUMBERS. |

*Figure 5b*

| # | COMPONENT | QUAN. | DESCRIPTION | PACKAGE | VENDOR | MFG. PN | REF. DESIGNATORS |
|---|---|---|---|---|---|---|---|
| 1 | 040-0002-XC | 1 | ASSY, PRGM, AT17C65, TRY20.MCS | | WYLE | RAW #133-0047 | U113 |
| 2 | 041-0010-B | 1 | ASSY, SMT PRGM, FLASH, 8MEG, 28F008, 2400 IMAGE | | | | U98 |
| 3 | 100-0003 | 9 | FILTER, TH, EMI, 2200PF, 3PIN, 100V | | MURATA ELECT | DST310-55Y5S222M100 | T1000,T1001,T1002,T1003, T1004,T1005,T1006 T1007,T1008 |
| 4 | 101-0001 | 12 | FILTER, SMT, ST4178, 10 MB, DATE CODE 9650 BAD | TRNS\20SOL | VALOR ELEC | ST4178 | T35,T36,T37,T38,T39, T40,T41,T42,T43,T44,T45, |
| | | | | | | | T46 |
| 5 | 131-0001 | 2 | IC,SMT, 7406 | 14SO\IPC | NSC | DM7406M | U24,U89 |
| | | | | | TEXAS INST | SN7406D | |
| 6 | 131-0002 | 1 | IC,SMT, 24C01A | | ATMEL CORP | AT24C01A-10SC | U65 |
| 7 | 131-0003 | 2 | IC,SMT, 49FCT805 | 20SOL\IPC | IDT CORPOR | IDT49FCT805BTSO | U73,U74 |
| 8 | 131-0004 | 1 | IC,SMT, 74ACT00 | 14SO\IPC | MOTOROLA | MC74ACT00D | U50 |
| 9 | 131-0005 | 3 | IC,SMT, 74ACT32 | | MOTOROLA | MC74ACT32D | U47,U48,U49 |
| | | | | | NSC | 74ACT32SC | |
| 10 | 131-0006 | 5 | IC,SMT,74ALS11 | 14SO\IPC | TEXAS INST | SN74ALS11AD | U18,U20,U22,U25,U78 |
| 11 | 131-0007 | 1 | IC,SMT, 74ALS574 | 20SOL\IPC | NSC | DM74ALS574AWM | U8 |
| | | | | | TEXAS INST | SN74ALS574BDW | |
| 12 | 131-0009 | 1 | IC,SMT, 74F125 | 14SO\IPC | MOTOROLA | MC74F125D | U23 |
| | | | | | NSC | 74F125SC | |

*Figure 5c*

| SAMPLE INPUT DATA FROM CUSTOMER DEFINING COMPONENT DESCRIPTIONS AND APPROVED VENDORS | | | | |
|---|---|---|---|---|
| COMPONENT | DESCRIPTION | PACKAGE | VENDOR | MFG. PN |
| 040-0002-XC | ASSY, PRGM, AT17C65, TRY20.MCS | | | |
| 041-0010-B | ASSY, SMT PRGM, FLASH, 8MEG, 28F008, 2400 IMAGE | | | |
| 100-0003 | FILTER, TH, EMI, 2200PF, 3PIN, 100V | | WYLE | RAW #133-0047 |
| 101-0001 | FILTER, SMT, ST4178, 10 MB, DATE CODE 9650 BAD | TRNSI20SOL | MURATA ELECT | DST310-55Y5S222M100 |
| 131-0001 | IC,SMT, 7406 | 14SOIIPC | VALOR ELEC | ST4178 |
| | | | NSC | DM7406M |
| | | | TEXAS INST | SN7406D |
| 131-0002 | IC,SMT, 24C01A | | ATMEL CORP | AT24C01A-10SC |
| 131-0003 | IC,SMT, 49FCT805 | 20SOL\IPC | IDT CORPOR | IDT49FCT805BTSO |
| 131-0004 | IC,SMT, 74ACT00 | | MOTOROLA | MC74ACT00D |
| 131-0005 | IC,SMT, 74ACT32 | 14SOIIPC | MOTOROLA | MC74ACT32D |
| | | | NSC | 74ACT32SC |
| 131-0006 | IC,SMT,74ALS11 | 14SOIIPC | TEXAS INST | SN74ALS11AD |
| 131-0007 | IC,SMT, 74ALS574 | 20SOL\IPC | NSC | DM74ALS574AWM |
| | | | TEXAS INST | SN74ALS574BDW |
| 131-0009 | IC,SMT, 74F125 | 14SOIIPC | MOTOROLA | MC74F125D |
| | | | NSC | 74125SC |

*Figure 5d*

| SAMPLE OF CUSTOMER DATA DEFINING REFERENCE DESIGNATORS AND COMPONENT QUANTITIES. | | |
|---|---|---|
| COMPONENT | QUAN. | REF. DESIGNATORS |
| 040-0002-XC | 1 | U113 |
| 041-0010-B | 1 | U98 |
| 100-0003 | 9 | T1000 |
| 100-0003 | 9 | T1001 |
| 100-0003 | 9 | T1002 |
| 100-0003 | 9 | T1003 |
| 100-0003 | 9 | T1004 |
| 100-0003 | 9 | T1005 |
| 100-0003 | 9 | T1006 |
| 100-0003 | 9 | T1007 |
| 100-0003 | 9 | T1008 |
| 101-0001 | 12 | T35, |
| 101-0001 | 12 | T36 |
| 101-0001 | 12 | T37 |
| 101-0001 | 12 | T38 |
| 101-0001 | 12 | T39 |
| 101-0001 | 12 | T40 |
| 101-0001 | 12 | T41 |
| 101-0001 | 12 | T42 |
| 101-0001 | 12 | T43 |
| 101-0001 | 12 | T44 |
| 101-0001 | 12 | T45 |
| 101-0001 | 12 | T46 |
| 131-0001 | 2 | U24 |
| 131-0001 | 2 | U89 |
| 131-0002 | 1 | U65 |
| 131-0003 | 2 | U73 |
| 131-0003 | 2 | U74 |
| 131-0004 | 1 | U50 |
| 131-0005 | 3 | U47 |
| 131-0005 | 3 | U48 |
| 131-0005 | 3 | U49 |
| 131-0006 | 5 | U18 |
| 131-0006 | 5 | U20 |
| 131-0006 | 5 | U22 |
| 131-0006 | 5 | U25 |
| 131-0006 | 5 | U78 |
| 131-0007 | 1 | U8 |
| 131-0009 | 1 | U23 |

*Figure 5e*

COMPONENT DESCRIPTION TABLE

| CUST. | COMPONENT | DESCRIPTION | PACKAGE |
|---|---|---|---|
| AA | 040-0002-XC | ASSY, PRGM, AT17C65, TRY20.MCS | |
| AA | 041-0010-B | ASSY, SMT PRGM, FLASH, 8MEG, 28F008, 2400 IMAGE | |
| AA | 100-0003 | FILTER, TH, EMI, 2200PF, 3PIN, 100V | |
| AA | 101-0001 | FILTER, SMT, ST4178, 10 MB, DATE CODE 9650 BAD | TRNS\20SOL |
| AA | 131-0001 | IC,SMT, 7406 | 14SOL\IPC |
| AA | 131-0002 | IC,SMT, 24C01A | |
| AA | 131-0003 | IC,SMT, 49FCT805 | 20SOL\IPC |
| AA | 131-0004 | IC,SMT, 74ACT00 | |
| AA | 131-0005 | IC,SMT, 74ACT32 | 14SOL\IPC |
| AA | 131-0006 | IC,SMT,74ALS11 | 14SOL\IPC |
| AA | 131-0007 | IC,SMT, 74ALS574 | 20SOL\IPC |
| AA | 131-0009 | IC,SMT, 74F125 | 14SOL\IPC |

*Figure 5f*

APPROVED VENDOR LIST TABLE

| CUST. | COMPONENT | VENDOR | MFG. PN |
|---|---|---|---|
| AA | 040-0002-XC | WYLE | RAW #133-0047 |
| AA | 100-0003 | MURATA ELECT | DST310-55Y5S222M100 |
| AA | 101-0001 | VALOR ELEC | ST4178 |
| AA | 131-0001 | NSC | DM7406M |
| AA | 131-0001 | TEXAS INST | SN7406D |
| AA | 131-0002 | ATMEL CORPOR | AT24C01A-10SC |
| AA | 131-0003 | IDT CORPOR | IDT49FCT805BTSO |
| AA | 131-0004 | MOTOROLA | MC74ACT00D |
| AA | 131-0005 | MOTOROLA | MC74ACT32D |
| AA | 131-0005 | NSC | 74ACT32SC |
| AA | 131-0006 | TEXAS INST | SN74ALS11AD |
| AA | 131-0007 | NSC | DM74ALS574AWM |
| AA | 131-0007 | TEXAS INST | SN74ALS574BDW |
| AA | 131-0009 | MOTOROLA | MC74F125D |
| AA | 131-0009 | NSC | 74F125SC |

*Figure 5g*

| PRODUCT TABLE | | | | |
|---|---|---|---|---|
| CUST | ASSEMBLY | REV | COMPONENT | REF. DESIGNATORS |
| AA | 020-0005 | D | 040-0002-XC | U113 |
| AA | 020-0005 | D | 041-0010-B | U98 |
| AA | 020-0005 | D | 100-0003 | T1000 |
| AA | 020-0005 | D | 100-0003 | T1001 |
| AA | 020-0005 | D | 100-0003 | T1002 |
| AA | 020-0005 | D | 100-0003 | T1003 |
| AA | 020-0005 | D | 100-0003 | T1004 |
| AA | 020-0005 | D | 100-0003 | T1005 |
| AA | 020-0005 | D | 100-0003 | T1006 |
| AA | 020-0005 | D | 100-0003 | T1007 |
| AA | 020-0005 | D | 100-0003 | T1008 |
| AA | 020-0005 | D | 101-0001 | T35, |
| AA | 020-0005 | D | 101-0001 | T36 |
| AA | 020-0005 | D | 101-0001 | T37 |
| AA | 020-0005 | D | 101-0001 | T38 |
| AA | 020-0005 | D | 101-0001 | T39 |
| AA | 020-0005 | D | 101-0001 | T40 |
| AA | 020-0005 | D | 101-0001 | T41 |
| AA | 020-0005 | D | 101-0001 | T42 |
| AA | 020-0005 | D | 101-0001 | T43 |
| AA | 020-0005 | D | 101-0001 | T44 |
| AA | 020-0005 | D | 101-0001 | T45 |
| AA | 020-0005 | D | 101-0001 | T46 |
| AA | 020-0005 | D | 131-0001 | U24 |
| AA | 020-0005 | D | 131-0001 | U89 |
| AA | 020-0005 | D | 131-0002 | U65 |
| AA | 020-0005 | D | 131-0003 | U73 |
| AA | 020-0005 | D | 131-0003 | U74 |
| AA | 020-0005 | D | 131-0004 | U50 |
| AA | 020-0005 | D | 131-0005 | U47 |
| AA | 020-0005 | D | 131-0005 | U48 |
| AA | 020-0005 | D | 131-0005 | U49 |
| AA | 020-0005 | D | 131-0006 | U18 |
| AA | 020-0005 | D | 131-0006 | U20 |
| AA | 020-0005 | D | 131-0006 | U22 |
| AA | 020-0005 | D | 131-0006 | U25 |
| AA | 020-0005 | D | 131-0006 | U78 |
| AA | 020-0005 | D | 131-0007 | U8 |
| AA | 020-0005 | D | 131-0009 | U23 |

*Figure 5h*

CHANGE RECORD
AA AUTOMATION

| DATE: | 04/15/98 | CHANGE NUMBER: | AA98014 |
|---|---|---|---|
| PRODUCT NAME | 020-0005 | REVISION | D |
| NATURE OF CHANGE | IMPROVE FILTRATION BY REPLACEMENT OF DEVICE AT U48. | | |

MODIFICATIONS

| QUAN. | ACTION | DEVICE | LOCATION(S) |
|---|---|---|---|
| 1 | DELETE | 131-0005 | U48 |
| 1 | ADD | 131-0006 | U48 |
|  |  |  |  |
|  |  |  |  |
|  |  |  |  |
|  |  |  |  |

| FOLLOWING UPDATE IDENTIFY PRODUCT AS: | | | |
|---|---|---|---|
| NEW PRODUCT NAME | 020-0005 | NEW REVISION | E |

*Figure 5i*

CHANGE RECORD
AA AUTOMATION

| DATE: | 04/15/98 | CHANGE NUMBER: | AA98046 |
|---|---|---|---|
| PRODUCT NAME | 020-0031 | REVISION | A |
| DESCRIPTION | PRODUCT REDESIGN. USE IMPROVE TRANSFORMER FOR ADDITIONAL FILTRATION. SIMILAR PRODUCT TO 020-0005 REV E WITH ONLY TRANSFORMER MODIFICATION. ADD NEW DEVICE TO AVL. | | |

| MODIFICATIONS ||||
|---|---|---|---|
| QUAN. | ACTION | DEVICE | LOCATION(S) |
| | REFER TO BOM INFORMATION PROVIDED ELECTRONICALLY. | | |
| | | | |
| | | | |
| | | | |

*Figure 5j*

| REFERENCE DESIG. 020-005 REV D ||||
|---|---|---|---|---|
| CUST. | ASSEMBLY | RV | COMPONENT | REF. |
| AA | 020-0005 | D | 040-0002-XC | U113 |
| AA | 020-0005 | D | 041-0010-B | U98 |
| AA | 020-0005 | D | 100-0003 | T1000 |
| AA | 020-0005 | D | 100-0003 | T1001 |
| AA | 020-0005 | D | 100-0003 | T1002 |
| AA | 020-0005 | D | 100-0003 | T1003 |
| AA | 020-0005 | D | 100-0003 | T1004 |
| AA | 020-0005 | D | 100-0003 | T1005 |
| AA | 020-0005 | D | 100-0003 | T1006 |
| AA | 020-0005 | D | 100-0003 | T1007 |
| AA | 020-0005 | D | 100-0003 | T1008 |
| AA | 020-0005 | D | 101-0001 | T35, |
| AA | 020-0005 | D | 101-0001 | T36 |
| AA | 020-0005 | D | 101-0001 | T37 |
| AA | 020-0005 | D | 101-0001 | T38 |
| AA | 020-0005 | D | 101-0001 | T39 |
| AA | 020-0005 | D | 101-0001 | T40 |
| AA | 020-0005 | D | 101-0001 | T41 |
| AA | 020-0005 | D | 101-0001 | T42 |
| AA | 020-0005 | D | 101-0001 | T43 |
| AA | 020-0005 | D | 101-0001 | T44 |
| AA | 020-0005 | D | 101-0001 | T45 |
| AA | 020-0005 | D | 101-0001 | T46 |
| AA | 020-0005 | D | 131-0001 | U24 |
| AA | 020-0005 | D | 131-0001 | U89 |
| AA | 020-0005 | D | 131-0002 | U65 |
| AA | 020-0005 | D | 131-0003 | U73 |
| AA | 020-0005 | D | 131-0003 | U74 |
| AA | 020-0005 | D | 131-0004 | U50 |
| AA | 020-0005 | D | 131-0005 | U47 |
| AA | 020-0005 | D | 131-0005 | U48 |
| AA | 020-0005 | D | 131-0006 | U50 |
| AA | 020-0005 | D | 131-0006 | U18 |
| AA | 020-0005 | D | 131-0006 | U20 |
| AA | 020-0005 | D | 131-0006 | U22 |
| AA | 020-0005 | D | 131-0006 | U25 |
| AA | 020-0005 | D | 131-0006 | U78 |
| AA | 020-0005 | D | 131-0007 | U8 |
| AA | 020-0005 | D | 131-0009 | U23 |

*Figure 5k(a)*

| REFERENCE DESIG. 020-005 REV E | | | | |
|---|---|---|---|---|
| CUST. | ASSEMBLY | RV | COMPONENT | REF. |
| AA | 020-0005 | E | 040-0002-XC | U113 |
| AA | 020-0005 | E | 041-0010-B | U98 |
| AA | 020-0005 | E | 100-0003 | T1000 |
| AA | 020-0005 | E | 100-0003 | T1001 |
| AA | 020-0005 | E | 100-0003 | T1002 |
| AA | 020-0005 | E | 100-0003 | T1003 |
| AA | 020-0005 | E | 100-0003 | T1004 |
| AA | 020-0005 | E | 100-0003 | T1005 |
| AA | 020-0005 | E | 100-0003 | T1006 |
| AA | 020-0005 | E | 100-0003 | T1007 |
| AA | 020-0005 | E | 100-0003 | T1008 |
| AA | 020-0005 | E | 101-0015 | T35, |
| AA | 020-0005 | E | 101-0015 | T36 |
| AA | 020-0005 | E | 101-0015 | T37 |
| AA | 020-0005 | E | 101-0015 | T38 |
| AA | 020-0005 | E | 101-0015 | T39 |
| AA | 020-0005 | E | 101-0015 | T40 |
| AA | 020-0005 | E | 101-0015 | T41 |
| AA | 020-0005 | E | 101-0015 | T42 |
| AA | 020-0005 | E | 101-0015 | T43 |
| AA | 020-0005 | E | 101-0015 | T44 |
| AA | 020-0005 | E | 101-0015 | T45 |
| AA | 020-0005 | E | 101-0015 | T46 |
| AA | 020-0005 | E | 131-0001 | U24 |
| AA | 020-0005 | E | 131-0001 | U89 |
| AA | 020-0005 | E | 131-0002 | U65 |
| AA | 020-0005 | E | 131-0003 | U73 |
| AA | 020-0005 | E | 131-0003 | U74 |
| AA | 020-0005 | E | 131-0004 | U50 |
| AA | 020-0005 | E | 131-0005 | U47 |
| AA | 020-0005 | E | 131-0006 | U48 |
| AA | 020-0005 | E | 131-0005 | U49 |
| AA | 020-0005 | E | 131-0006 | U18 |
| AA | 020-0005 | E | 131-0006 | U20 |
| AA | 020-0005 | E | 131-0006 | U22 |
| AA | 020-0005 | E | 131-0006 | U25 |
| AA | 020-0005 | E | 131-0006 | U78 |
| AA | 020-0005 | E | 131-0007 | U8 |
| AA | 020-0005 | E | 131-0009 | U23 |

*Figure 5k(b)*

| REFERENCE DESIG. 020-C0031 REV A ||||
|---|---|---|---|---|
| CUST. | ASSEMBLY | RV | COMPONENT | REF. |
| AA | 020-0031 | A | 040-0002-XC | U113 |
| AA | 020-0031 | A | 041-0010-B | U98 |
| AA | 020-0031 | A | 100-00014 | T1000 |
| AA | 020-0031 | A | 100-00014 | T1001 |
| AA | 020-0031 | A | 100-00014 | T1002 |
| AA | 020-0031 | A | 100-00014 | T1003 |
| AA | 020-0031 | A | 100-00014 | T1004 |
| AA | 020-0031 | A | 100-00014 | T1005 |
| AA | 020-0031 | A | 100-00014 | T1006 |
| AA | 020-0031 | A | 100-00014 | T1007 |
| AA | 020-0031 | A | 100-00014 | T1008 |
| AA | 020-0031 | A | 101-00015 | T35, |
| AA | 020-0031 | A | 101-00015 | T36 |
| AA | 020-0031 | A | 101-00015 | T37 |
| AA | 020-0031 | A | 101-00015 | T38 |
| AA | 020-0031 | A | 101-00015 | T39 |
| AA | 020-0031 | A | 101-00015 | T40 |
| AA | 020-0031 | A | 101-00015 | T41 |
| AA | 020-0031 | A | 101-00015 | T42 |
| AA | 020-0031 | A | 101-00015 | T43 |
| AA | 020-0031 | A | 101-00015 | T44 |
| AA | 020-0031 | A | 101-00015 | T45 |
| AA | 020-0031 | A | 101-00015 | T46 |
| AA | 020-0031 | A | 131-0001 | U24 |
| AA | 020-0031 | A | 131-0001 | U89 |
| AA | 020-0031 | A | 131-0002 | U65 |
| AA | 020-0031 | A | 131-0003 | U73 |
| AA | 020-0031 | A | 131-0003 | U74 |
| AA | 020-0031 | A | 131-0004 | U50 |
| AA | 020-0031 | A | 131-0005 | U47 |
| AA | 020-0031 | A | 131-0006 | U48 |
| AA | 020-0031 | A | 131-0005 | U49 |
| AA | 020-0031 | A | 131-0006 | U18 |
| AA | 020-0031 | A | 131-0006 | U20 |
| AA | 020-0031 | A | 131-0006 | U22 |
| AA | 020-0031 | A | 131-0006 | U25 |
| AA | 020-0031 | A | 131-0006 | U78 |
| AA | 020-0031 | A | 131-0007 | U8 |
| AA | 020-0031 | A | 131-0009 | U23 |

*Figure 5k(c)*

| | CUST. CODE | ASSEMBLY NAME | REV. | DATE | PERSON | REASON | FILE_KEY | VERSION |
|---|---|---|---|---|---|---|---|---|
| AVL INDEX SECTION | | | | | | | | |
| i1 | \AVL | \AVL | \AVL | 04/01/98 | TSMITH | INITIAL PRODUCT LOAD | -1 | 0 |
| i2 | \AVL | \AVL | \AVL | 04/02/98 | BBURNS | CORRECTED VENDOR NAME | -1 | 1 |
| i3 | \AVL | \AVL | \AVL | 05/15/98 | LALLEN | NEW BOARD LAYOUT | -1 | 2 |
| COMPONENT INDEX SECTION | | | | | | | | |
| i4 | \CMP | \CMP | \CMP | 04/01/98 | TSMITH | INITIAL PRODUCT LOAD | -2 | 0 |
| i5 | \CMP | \CMP | \CMP | 04/19/98 | RABRAMS | CLARIFY COMPONENT TYPES | -2 | 1 |
| i6 | \CMP | \CMP | \CMP | 05/15/98 | LALLEN | NEW BOARD LAYOUT | -2 | 2 |
| PRODUCT INDEX SECTION | | | | | | | | |
| i7 | AA | 020-0005 | D | 04/01/98 | TSMITH | INITIAL PRODUCT LOAD | 15 | 0 |
| i8 | AA | 020-0005 | E | 04/21/98 | FMORSE | CORRECT NOISE PROBLEM | 15 | 1 |
| i9 | AA | 020-0031 | A | 05/15/98 | LALLEN | NEW BOARD LAYOUT | 15 | 2 |

*Figure 6a*

APPROVED VENDOR LIST TABLE

| | CUST. | COMPONENT | VENDOR | MFG. PN | ON | OFF |
|---|---|---|---|---|---|---|
| a1 | AA | 040-0002-XC | WYLE | RAW #133-0047 | 0 | |
| a2 | AA | 100-0003 | MURATA ELECT | DST310-55Y5S222M100 | 0 | |
| a3 | AA | 100-0014 | MURATA ELECT | DST310 55Y5S372M100 | 2 | |
| a4 | AA | 101-0001 | VALOR ELEC | ST4178 | 0 | |
| a5 | AA | 131-0001 | NSC | DM7406M | 0 | 1 |
| a6 | AA | 131-0001 | NATIONAL SE | DM7406M | 1 | |
| a7 | AA | 131-0001 | TEXAS INST | SN7406D | 0 | 1 |
| a8 | AA | 131-0002 | ATMEL CORP | AT24C01A-10SC | 0 | |
| a9 | AA | 131-0003 | IDT CORPOR | IDT49FCT805BTSO | 0 | |
| a10 | AA | 131-0004 | MOTOROLA | MC74ACT00D | 0 | |
| a11 | AA | 131-0005 | MOTOROLA | MC74ACT32D | 0 | |
| a12 | AA | 131-0005 | NSC | 74ACT32SC | 0 | 1 |
| a13 | AA | 131-0005 | NATIONAL SE | 74ACT32SC | 1 | |
| a14 | AA | 131-0006 | TEXAS INST | SN74ALS11AD | 0 | |
| a15 | AA | 131-0007 | NSC | DM74ALS574AWM | 0 | 1 |
| a16 | AA | 131-0007 | NATIONAL SE | DM74ALS574AWM | 1 | |
| a17 | AA | 131-0007 | TEXAS INST | SN74ALS574BDW | 0 | |
| a18 | AA | 131-0009 | MOTOROLA | MC74F125D | 0 | |
| a19 | AA | 131-0009 | NSC | 74F125SC | 0 | 1 |
| a20 | AA | 131-0009 | NATIONAL SE | 74F125SC | 1 | |

*Figure 6b*

COMPONENT DESCRIPTION TABLE

|     | CUST. | COMPONENT   | DESCRIPTION                                              | PACKAGE    | ON | OFF |
|-----|-------|-------------|----------------------------------------------------------|------------|----|-----|
| c1  | AA    | 040-0002-XC | ASSY, PRGM, AT17C65, TRY20.MCS                           |            | 0  |     |
| c2  | AA    | 041-0010-B  | ASSY, SMT PRGM, FLASH, 8MEG, 28F008, 2400 IMAGE          |            | 0  |     |
| c3  | AA    | 100-0003    | FILTER, TH, EMI, 2200PF, 3PIN, 100V                      |            | 0  | 1   |
| c4  | AA    | 100-0003    | FILTER, TH, EMI, 2200PF, 3PIN, 100V, PREFORMED           |            | 1  |     |
| c5  | AA    | 100-0014    | FILTER, TH, EMI, 3700PF, 3PIN, 100V, PREFORMED           |            | 2  |     |
| c6  | AA    | 101-0001    | FILTER, SMT, ST4178, 10 MB, DATE CODE 9650 BAD           | TRNS\20SOL | 0  |     |
| c7  | AA    | 131-0001    | IC,SMT, 7406                                             | 14SOI\IPC  | 0  |     |
| c8  | AA    | 131-0002    | IC,SMT, 24C01A                                           |            | 0  |     |
| c9  | AA    | 131-0003    | IC,SMT, 49FCT805                                         | 20SOL\IPC  | 0  |     |
| c10 | AA    | 131-0004    | IC,SMT, 74ACT00                                          |            | 0  |     |
| c11 | AA    | 131-0005    | IC,SMT, 74ACT32                                          | 14SOI\IPC  | 0  | 1   |
| c12 | AA    | 131-0005    | IC,SMT, 74ACT32 HIGH PERFORMANCE                         | 14SOI\IPC  | 1  |     |
| c13 | AA    | 131-0006    | IC,SMT, 74ALS11                                          | 14SOI\IPC  | 0  |     |
| c14 | AA    | 131-0007    | IC,SMT, 74ALS574                                         | 20SOL\IPC  | 0  |     |
| c15 | AA    | 131-0009    | IC,SMT, 74F125                                           | 14SOI\IPC  | 0  |     |

*Figure 6c*

| POS. | PRODUCT TABLE ||||| 
|---|---|---|---|---|---|
| | KEY FILE | COMPONENT | REF. | ON | OFF |
| | <15 | OTHER PRODUCT INFORMATION WITH FILE KEY VALUES OTHER THAN 15. ||||
| 15.1 | 15 | 040-0002-XC | U113 | 0 | |
| 15.2 | 15 | 041-0010-B | U98 | 0 | |
| 15.3 | 15 | 100-0003 | T1000 | 0 | 2 |
| 15.4 | 15 | 100-0004 | T1000 | 2 | |
| 15.5 | 15 | 100-0003 | T1001 | 0 | 2 |
| 15.6 | 15 | 100-0004 | T1001 | 2 | |
| 15.7 | 15 | 100-0003 | T1002 | 0 | 2 |
| 15.8 | 15 | 100-0004 | T1002 | 2 | |
| 15.9 | 15 | 100-0003 | T1003 | 0 | 2 |
| 15.10 | 15 | 100-0004 | T1003 | 2 | |
| 15.11 | 15 | 100-0003 | T1004 | 0 | 2 |
| 15.12 | 15 | 100-0004 | T1004 | 2 | |
| 15.13 | 15 | 100-0003 | T1005 | 0 | 2 |
| 15.14 | 15 | 100-0004 | T1005 | 2 | |
| 15.15 | 15 | 100-0003 | T1006 | 0 | 2 |
| 15.16 | 15 | 100-0004 | T1006 | 2 | |
| 15.17 | 15 | 100-0003 | T1007 | 0 | 2 |
| 15.18 | 15 | 100-0004 | T1007 | 2 | |
| 15.19 | 15 | 100-0003 | T1008 | 0 | 2 |
| 15.20 | 15 | 100-0004 | T1008 | 2 | |
| 15.21 | 15 | 101-0001 | T35 | 0 | |
| 15.22 | 15 | 101-0001 | T36 | 0 | |
| 15.23 | 15 | 101-0001 | T37 | 0 | |
| 15.24 | 15 | 101-0001 | T38 | 0 | |
| 15.25 | 15 | 101-0001 | T39 | 0 | |
| 15.26 | 15 | 101-0001 | T40 | 0 | |
| 15.27 | 15 | 101-0001 | T41 | 0 | |
| 15.28 | 15 | 101-0001 | T42 | 0 | |
| 15.29 | 15 | 101-0001 | T43 | 0 | |
| 15.20 | 15 | 101-0001 | T44 | 0 | |
| 15.21 | 15 | 101-0001 | T45 | 0 | |
| 15.22 | 15 | 101-0001 | T46 | 0 | |
| 15.23 | 15 | 131-0001 | U24 | 0 | |
| 15.24 | 15 | 131-0001 | U89 | 0 | |
| 15.25 | 15 | 131-0001 | U65 | 0 | |
| 15.26 | 15 | 131-0001 | U73 | 0 | |
| 15.27 | 15 | 131-0001 | U74 | 0 | |
| 15.28 | 15 | 131-0001 | U50 | 0 | |
| 15.29 | 15 | 131-0001 | U47 | 0 | |
| 15.30 | 15 | 131-0001 | U48 | 0 | 1 |
| 15.31 | 15 | 131-0001 | U48 | 1 | |
| 15.32 | 15 | 131-0001 | U49 | 0 | |
| 15.33 | 15 | 131-0001 | U18 | 0 | |
| 15.34 | 15 | 131-0001 | U20 | 0 | |
| 15.35 | 15 | 131-0001 | U22 | 0 | |
| 15.36 | 15 | 131-0001 | U25 | 0 | |
| 15.37 | 15 | 131-0001 | U78 | 0 | |
| 15.38 | 15 | 131-0001 | U8 | 0 | |
| 15.39 | 15 | 131-0001 | U23 | 0 | |
| | >15 | OTHER PRODUCT INFORMATION WITH FILE KEY VALUES OTHER THAN 15. ||||

*Figure 6d*

METHOD FOR MINIMIZING STORAGE REQUIREMENTS FOR PRODUCTION ASSEMBLY INFORMATION AND UPDATES

BACKGROUND OF THE INVENTION

1. Field of Use

The present invention relates to database systems and methods for managing information and more particularly to systems and methods for storing information pertaining to manufacturing assembly information wherein several pieces of such information are combined to produce a bill of materials document.

2. Prior Art

In the manufacturing assembly process, it is essential that for each assembly manufactured by an organization pertinent product related information for currently produced and previously produced assemblies be made available to all personnel involved in such process. In order to do this, the organization generally provides a network system environment wherein all users are given access to a single reference source of information maintained on a server system from a number of client stations.

For each assembly manufactured by the organization, there is a need to be able to understand which device components are used on the assembly, where the components are located on the assembly and where such component parts can be purchased. This information is generally compiled into a format usable by the organization and is more commonly known as a "bill of materials" (BOM). In producing a BOM document, several pieces of information must be brought together. The BOM document generally includes: (1) a listing of the material required usually arranged according to customer part number; (2) the number of items having a particular part number for the specific assembly; (3) a description of the component part that identifies what the part is (e.g. resistor, capacitor, etc.); (4) the vendor or vendors sources from which the component part can be purchased; (5) the vendor source's part number for the component part; and (6) the location on the assembly where the component part is to be installed. The location is usually defined in terms of some topographical reference, such as U1, etc. One of these references is allocated for each component part type used on the assembly.

The bill of materials for the printed circuit board assembly is generally constructed to contain the information for each component part to be used on the assembly. More specifically, the bill of materials document would contain the following information for each component part:

(1) The name of the component using a customer or internal designation that allows the component to be distinguishable from any other component used or received by the manufacturing organization. For example, the component name may be based on the customer's part number for that component part;

(2) A description of the component part in terms that define its physical or electronic attributes/characteristics. This information may appear on the surface of the component part;

(3) The physical location on the printed circuit board assembly where the component can be found. Reference locations are typically related to a design print or may be marked directly on the printed circuit board;

(4) The manufacturers of the component part (vendor) from which the board manufacturer may purchase the component part. Where there are multiple vendors approved as sources for the component part, multiple entries are required.

(5) The vendor designation for the component part that the manufacturer's purchasing department would use to purchase the part. Each vendor typically assigns their own part number designation.

In a prior art method, several of the above information items representative of product information were stored in a database structure (i.e., Product Table) which when read into an EXCEL spreadsheet would appear as follows.

| Prefix | Board | Rev | Ref. Desig | Component | Other data |
|--------|-----------|-----|-----------|-----------|-----------|
| AA | AA020-0001 | A | R01 | 191-0014 | N/A |
| AA | AA020-0001 | A | R02 | 191-0017 | N/A |
| AA | AA020-0001 | A | R15 | 191-0014 | N/A |
| AA | AA020-0001 | A | R27 | 191-0014 | N/A |
| AA | AA020-0001 | A | R43 | 191-0054 | N/A |

In this method, the number of entries in the file representing the product table would be made equal to the number of reference designators in the printed circuit board assembly. While this method was adequate for storing such information, and for providing reasonably fast access, it was found to require storage of a considerable amount of repetitive or redundant information in the database. This was not deemed to be an insurmountable problem except when there was a system requirement for revision retention for tracking and quality purposes. In order to insure that all customer information was retained for some indeterminate period of time, then it became necessary to preserve the component parts list for each revision of the product data each time a product change notice was received. Thus, for a simple change of one component part type, it became necessary to duplicate all of the entries in the product list and assign a new reference designation for the product revision. For example, for the single component change, the product file would have to be duplicated for each revision with the result that the updated database would appear as follows.

| Prefix | Board | Rev | Ref. Desig | Component | Other data |
|--------|-----------|-----|-----------|-----------|-----------|
| AA | AA020-0001 | A | R01 | 191-0014 | N/A |
| AA | AA020-0001 | A | R02 | 191-0017 | N/A |
| AA | AA020-0001 | A | R15 | 191-0014 | N/A |
| AA | AA020-0001 | A | R27 | 191-0014 | N/A |
| AA | AA020-0001 | A | R43 | 191-0054 | N/A |
| AA | AA020-0001 | A1 | R01 | 191-0014 | N/A |
| AA | AA020-0001 | A1 | R02 | 191-0017 | N/A |
| AA | AA020-0001 | A1 | R15 | 191-0014 | N/A |
| AA | AA020-0001 | A1 | R27 | 191-0057 | N/A |
| AA | AA020-0001 | A1 | R43 | 191-0054 | N/A |

In the above example, reversion A1 of the printed circuit board AA020-0001 had a single component part change (R27) designated as 191-0014 and the revision now is to be populated with different component part R27 designated as 191-0057. While this example shows a small change, it still illustrates that each change to a printed circuit board product results in a complete duplication of all of the database entries for that version of the product wherein the actual changes are incorporated in those entries.

Additionally, in order to provide a reasonably performant system, it is necessary to have a short table of products contained in the database to define the products contained in that database. In the prior art method, a conventional query performed on the database to obtain a sample of all available entries would require the use of several systems and would grow as the file size grew. That is, in the prior art method, each time the product data was updated, a single record had to be placed in an index table in order to define what is in the product table. Thus, the prior art method was found to be less performant unless expanded hardware was introduced into the system.

In the case of the tables used for storing component and approved vendor information, the prior art method did not provide for retaining information from one update to the next but rather just replaced the old information in the database. Thus, there was no provision for historical information capable of being retrieved for any of the component and approved vendor information items aside from operator comments that were recorded in a separate history tracking file.

Accordingly, it is a primary object of the present invention to provide a method and system for eliminating the amount of duplicate information contained in a manufacturing database.

It is a further object of the present invention to provide a method and system that is able to provide historical information with minimum increase in database storage requirements.

SUMMARY OF THE INVENTION

The above objects are achieved in a preferred embodiment of the method and database system of the present invention. The system includes a database for storing a plurality of tables containing product related information utilized in generating a bill of materials document. The system also includes a selection menu facility component and a data selection component, both of which operatively couple to the database. The selection menu facility component enables an operator or user to access the database for obtaining information pertaining to a particular printed circuit board assembly. The data selection component operates to search and extract from the database tables, all of the pertinent information needed to generate/display a bill of materials document based on information generated in response to an operator selection.

In the preferred embodiment, the tables include a product table, an approved vendors table and a component description table and a product directory index table which operates as a filtration mechanism in accessing the data in the remaining tables. The product directory index table is used for storing a number of index value entries coded in a predetermined manner that represent of all of the "valid" (in production) printed circuit board assemblies. In the preferred embodiment, each index entry is coded to contain first and second types of key values. The first type of key value (file key) is coded to define the specific information associated with a particular product selected for access. The file key is used to select the appropriate table entries from the database for a particular printed circuit board product. This file key value eliminates the need to replicate the product name and revision information in every table entry of the database. Additionally, the file key reduces the amount of information associated with the storage of information in the database. In the preferred embodiment, the customer prefix, assembly and revision designations used in the prior art are reduced to a single integer. In the preferred embodiment, for example, this allows up to 32,768 distinct product groups in a product table. In many instances, a number of products can be placed in the same group. For greater capability, it is easy to replace the integer values with a larger integer value. Further, information can be transferred to a backup file to be used in those instances where a full analysis of past history is required to be maintained.

Associated with the file key is a file version value that defines the point at which an item was added or deleted from each of the database tables. This value makes it possible when updating a product to record only the affected items. The file version value is used in conjunction with the second type of key. The second type of key value corresponds to a pair of key values included in each database table entry coded to define the data selection criteria conditions based on the file version value contained in a selected product directory entry. Typically, an operator does not know the file version value since it is only used by the system for data selection. That is, the file version number value is provided for use by the system's data selection component as a filtering mechanism during the data selection process.

In the preferred embodiment, the pair of key values is contained in "ON" field and an "OFF" field of each table entry. The "ON" field value is initially set to a predetermined value identifying which version of the printed circuit board assembly the entry was introduced. For example, in case of the product table, each table entry pertaining to product when the assembly information was first loaded into the database has its "ON" field initially set to designate version $0$ while the "OFF" field of such entry is set to a NULL value. The NULL value is used to further reduce database requirements.

As the database is updated for adding different versions of a particular printed board assembly, the values contained in the "ON" and "OFF" fields are changed to indicate if a particular entry is to be utilized in the new version of the printed circuit board assembly. For example, if an entry is not used in a next version of the assembly, the "ON" field will remain the same but the "OFF" field will be set to designate that new version. For example, if the next version is designated as version $1$ in the product table entry for the particular product, then the "OFF" field NULL value is changed to a "1". In addition, each of the product table component part entries of the new version of the product will have its "ON" field set to a "1" value.

In operation, an operator will enter a product name value into the system, via the selection menu component, for which the product directory index table will cause the selection menu component to display a list of entries for the designated board product indicating all of the assembly revisions pertaining to such product. In response to the operator's selection specifying the desired product revision, the menu selection component in response to the product directory index table information, provides the data selection component with the appropriate file key and file version values. Using these values, the data selection component searches the database tables and extracts all of the data items pertaining to the particular version of the assembly product as a function of the values stored in the entry ON and OFF fields. The data selection component then organizes the extracted data items in memory for generating or displaying to the operator, an appropriate bill of materials document for that particular revision of the board product.

In the preferred embodiment, the data selection component utilizes a predetermined selection criteria/algorithm. For example, product table entries for a product having a file key equal to "k" and a file version number equal to "n" are selected for inclusion in a bill of materials document to be displayed or printed out based on the following criteria. Each extracted data item has a file key equal to "k" AND a version ON field equal to "n" AND their version OFF field has a value less than "n" or a NULL value.

The present invention's use of key values in a product directory index table and in the database table entries results in a significant reduction in database storage requirements and also enables the generation of the same bill of materials documents that was obtainable by the prior art method. That is, the data selection component in combination with the database table entry structure enables the proper development of table information that is the same as depicted in the prior art database structure. Further, the significant reduction in size of the database and high performance attendant with such organization makes the system easier to update and maintain. Moreover, the system is also able to provide a history of the state of all prior revisions of all of the products entered into the system.

The preferred embodiment uses a similar file key and version designation to obtain the appropriate component information from the component table but a customer code designation is utilized as the primary key. The system utilizes the version on, version off method defined above in accessing information in the product table. Similarly, information in the approved vendor table is accessed using the customer code, and the version on, version off method previously defined above to obtain the current list of approved vendor information for components defined on a Bill of Materials.

The above objects and advantages of the present invention will be better understood from the following description when taken in conjunction with the accompanying drawings.

BRIEF DESCRIPTION OF THE DRAWINGS

FIGS. 5a through 5k (a–c) illustrate the prior art database organization and method and examples of change information that can be provided in support of product modification.

FIGS. 6a through 6d illustrate the database organization for product, component and approved vendor data utilized by the system and method of the present invention.

DESCRIPTION OF THE PREFERRED EMBODIMENT

FIG. 1

Figure 1:
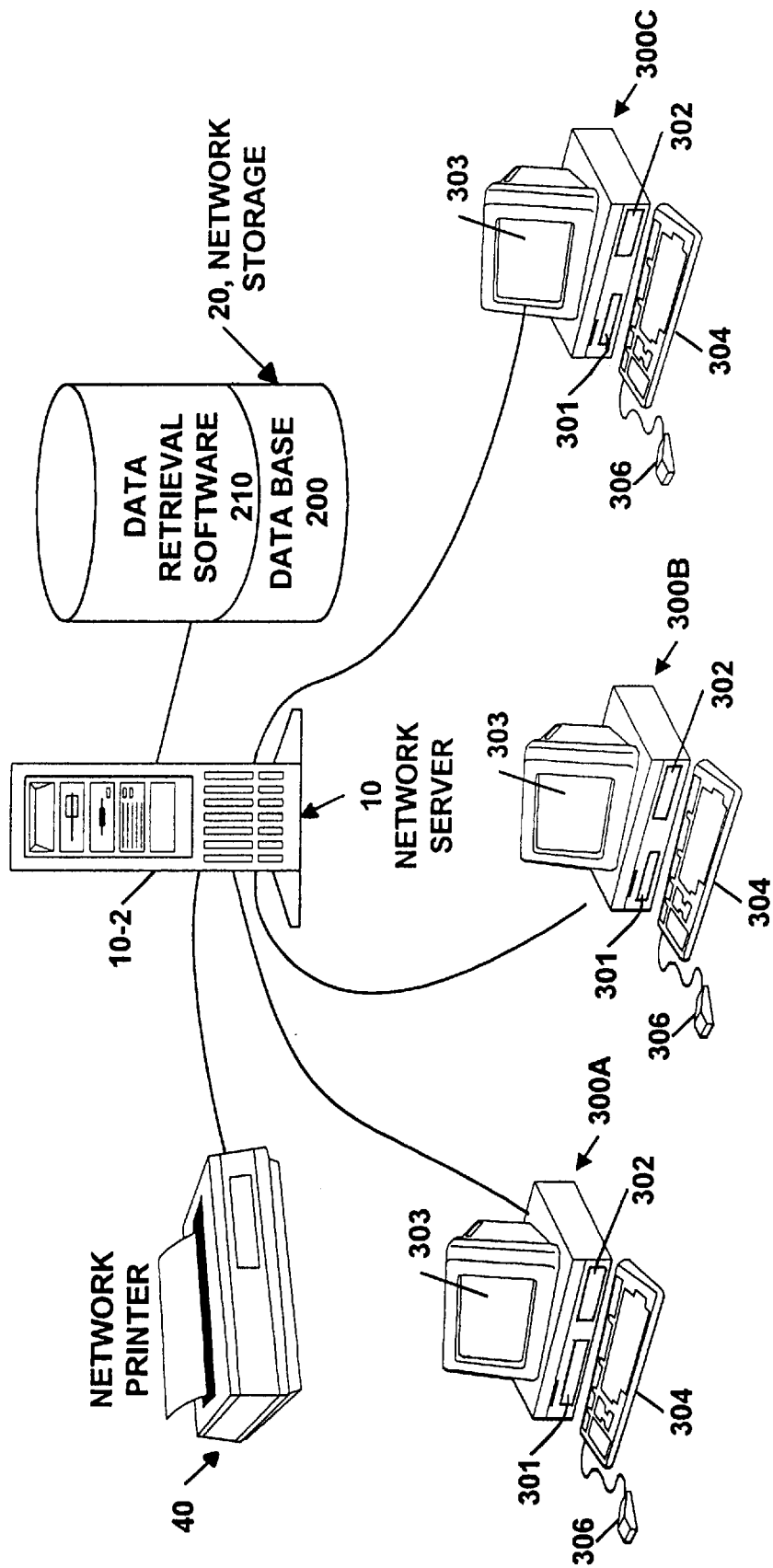
FIG. 1 is an overall block diagram of a system that utilizes the system and method of the present invention.

FIG. 1 illustrates in block diagram form, a conventional networking environment for data entry, viewing and reporting. As shown, the network environment includes a network server unit 10 that connects to a network storage unit 20 and to a network printer 40 as shown. The network environment further includes a plurality of independently operated client processing systems 300A through 300C that connect to the network server unit 10 via a corresponding number of standard local area network (LAN) connections 10 for sharing common network storage and network printer facilities.

For the purposes of the present invention, the hardware components of the network environment may be considered conventional in design. For example, each client system includes a standard desk top computer system such as 300A through 300C. As shown, each client system includes a random access storage unit 301 (main memory), disk storage unit 302, a display unit 303, a keyboard 304 and mouse device 306. The client systems run under standard windows based operating systems, such as Windows 3.1, Windows NT or Windows 95 developed by Microsoft Corporation. It will be appreciated that any other type of windows based operating systems or software may also be used. Similarly, the network server unit 10 operates under the control of a windows based operating system such as Windows NT.

The network storage 20 takes the form of standard disk storage and is organized to include storage space for the components of the data retrieval software 210 and the product related table structures of database 200 utilized by software 210 according to the teachings of the present invention. It can be assumed that such software and table structures are loaded onto storage 20 in a conventional manner.

Figure 2:
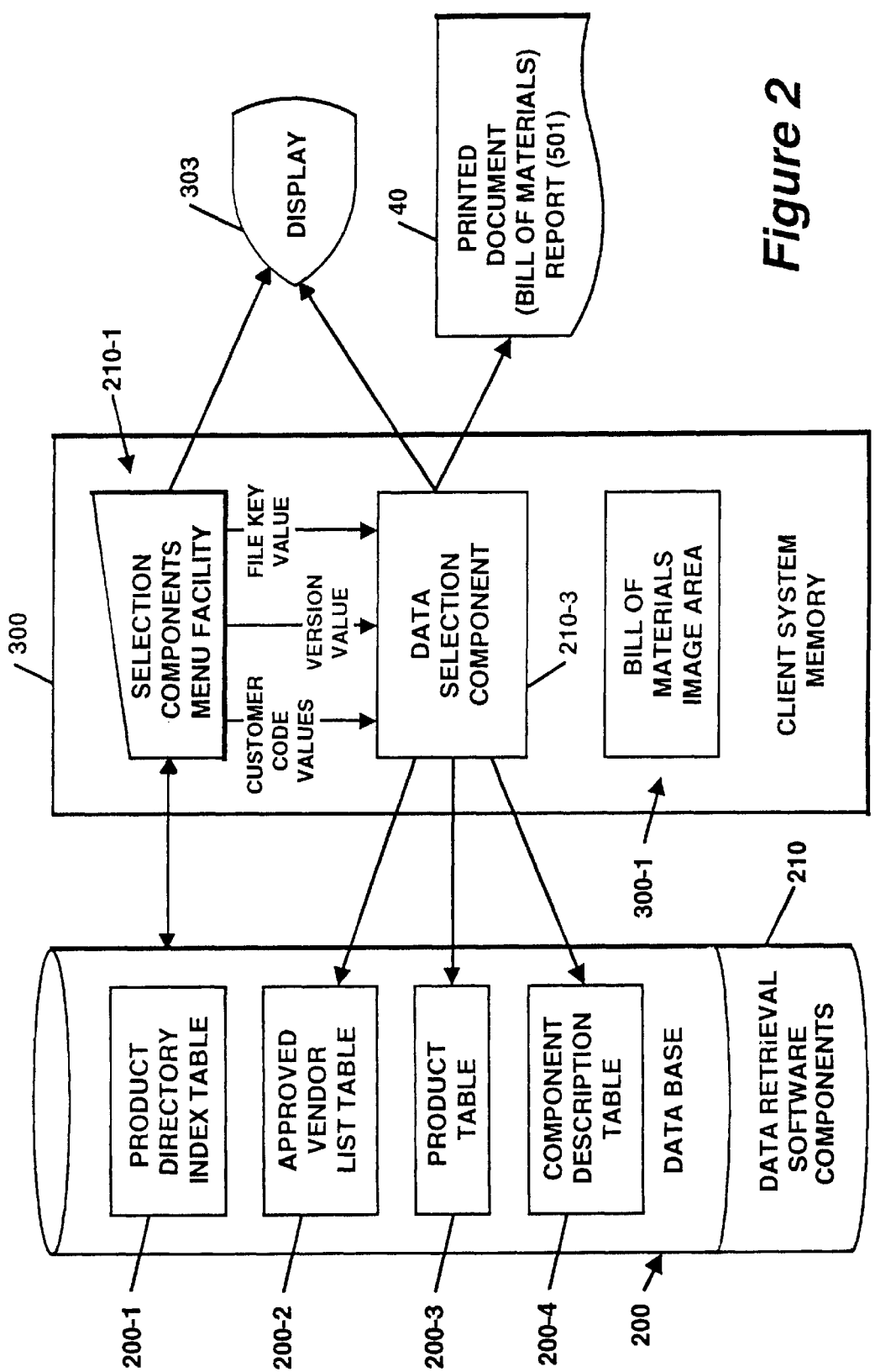
FIG. 2 illustrates in greater detail, the components of the database and data retrieval software of the system of FIG. 1.

FIG. 2 illustrates in greater detail, the organization of the database 200 and data retrieval software 210. As indicated, the database 200 is organized to contain the plurality of table structures 200-1 through 200-4. In greater detail, the database 200 includes a Product Directory Index table 200-1, an Approved Vendors Table 200-2, a Product Table 200-3 and a Component Description Table 200-4. Product Directory Index table 200-1 contains a plurality of entry locations for storing index information for all valid printed circuit board assemblies. The format of each index entry location is illustrated in greater detail in FIG. 6a. The Approved Vendors Table 200-2 contains locations for storing vendor information outlining for each of the component designations, the sources where such materials can be obtained and the part number used by such sources to identify such component. Such information is formatted as illustrated in FIG. 6b. The Product Table 200-3 contains locations for storing information outlining which component parts are to be placed on a given printed circuit board assembly and the component parts are located on each such assembly. Such information is formatted as illustrated in FIG. 6d. The Component Description Table 200-4 contains locations for storing information that provides generic descriptions for the different types of component parts. This information is formatted as illustrated in FIG. 6c.

Figure 4:
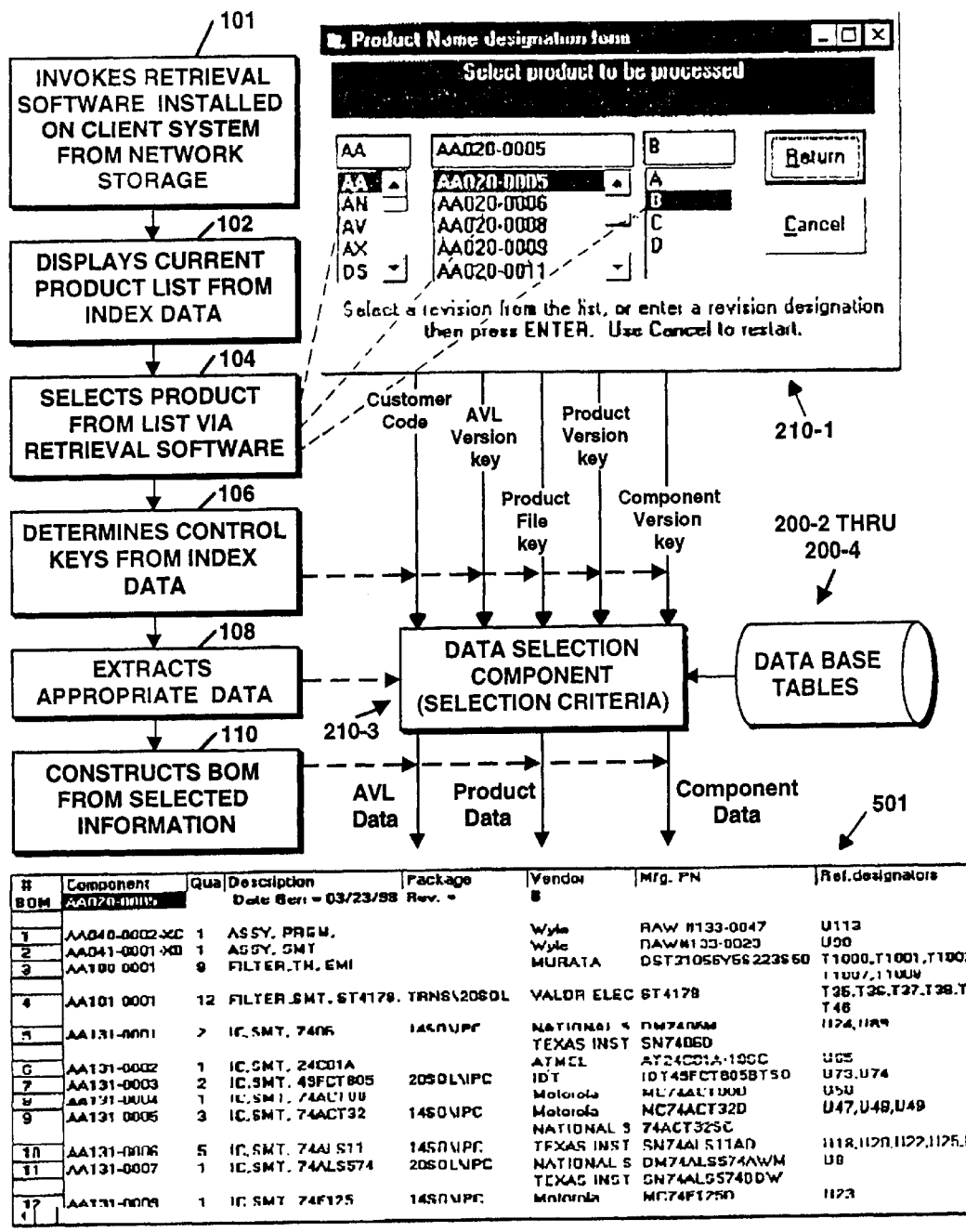
FIG. 4 is a flowchart illustrating the operation of the system and method of the present invention.

In FIG. 2, the different components of the data retrieval software 210 are assumed as illustrated as having been stored in client system memory 300. As shown, these components include selection menu facility component 210-1 and data selection component 210-3. As indicated, the selection menu facility component 210-1 operatively couples to the database 200 and to the client system display unit 303. The selection menu facility component 210-1 provides a number of menus for enabling an operator to make selections relating to a particular printed circuit board product. A representative menu provided by menu facility component 210-1 is illustrated in FIG. 4. The data selection component 210-3 operatively couples to all of the tables contained in database 200 as indicated. In response to the customer code, file key and version number values received from database 200, selection component 210-3 operates to extract the appropriate data for generation of bill of materials report information within a memory grid image area 300-1. The selection component 210-3 also operatively couples to display unit 303 and to network printer 40 for displaying and printing out respectively, the bill of materials report information. A representative report is illustrated in FIG. 4.

Each of the data retrieval software components 210-1 and 21-3 are written in version 3.0 of the Visual Basic Programming Language. The implementation of selection component 210-3 illustrated in greater detail in FIG. 3. As indicated, the component 210-3 performs a series of functions labeled f1 through f1 that result in the generation of a bill of materials report 501.

The function f1 is used for extracting component detail information from the component description table 200-4 of FIG. 2. This operation is carried out using the latest component file version number key and customer code obtained from the product directory index table. As indicated in FIG. 6a, the component index shares the same table as the product index but the information in the table is used differently. For all component table references, the corresponding index entry contains a file_key of −2. This key is used solely to isolate component index entries from all regular product table index entries, (which are assigned values of 0 to 31,767. The differentiator for accessing the component table information is based on the customer code, 2 to 4 characters in length. For all intentive purposes, the customer code is used as the primary file key selection method for accessing all of the entries in the component table.

The data selection component 210-3 performs the extraction using the following selection criteria: SELECT component designation (comp_desig) and component description (Comp_desc) information from Component Description Table 200-4 (comp_ist) WHERE customer prefix (cust_prefix) equals customer code AND component version entry's ON field value (CompVersOn) equals or is less than the component's version number (comp_vers) AND the component version OFF field value (compvers_off) equals NULL OR is less than the component's version number (comp_vers)]. This results in the selection of the appropriate entries from component description table 200-4.

The function f2 is used for extracting component detail information from the latest Approved Vendors Table 200-2 of FIG. 2. This operation is carried out using the Approved Vendor list version key and customer code obtained from the Approved Vendor list (index). As illustrated in FIG. 6a, the approved vendor table index shares the same table as the product index but the information in the table is used differently. For all approved vendor list table references, the corresponding index entry contains a file_key of −1. This key is used solely to isolate approved vendor list table entries from all other index entries. The differentiator for accessing the component table information is based on the customer prefix, a 2 to 4 character prefix code. For all intensive purposes, the customer prefix code represents the file key selection method for all of the entries in the component table. The data selection component 210-3 performs the extraction using the following selection criteria: SELECT component designation (comp_desig), manufacturer Id (Mfg_id) and manufacturer part number (Mfg_pn) information from Approved Vendors Table 200-2 (AVL_list) WHERE customer prefix (cust_prefix) equals customer code and the Approved Vendor list version entry's ON field value (AVLVersOn) equals or is less than the Approved Vendors list version number value (AVL_vers) AND [the Approved Vendors list entry's OFF field value (AVLvers_off) is NULL or less than the Approved Vendors list version number value AVL_vers)]. This results in the selection of the appropriate entries from Approved Vendors Table 200-2.

The function f3 is used to extract product information from Product Table 200-3 of FIG. 2. As indicated, the operation is carried out using the file key value (file_key) and version key value (Version) obtained from the Product Directory index 200-1 of FIGS. 2 and 6a. The data selection component 210-3 performs the extraction using the following selection criteria: SELECT component designation (comp_desig) and reference designation information (Ref_desig) from the Product Table 200-3 entries WHERE the file reference value (file_ref) equals the file key value (file_key) and the entry's version ON field (Version_on) equals the version key (Version) AND [the entry's Version OFF field value equals NULL or is less than the version key (Version)]. This results in the extraction of the example entries from Product Table 200-3.

Figure 3:
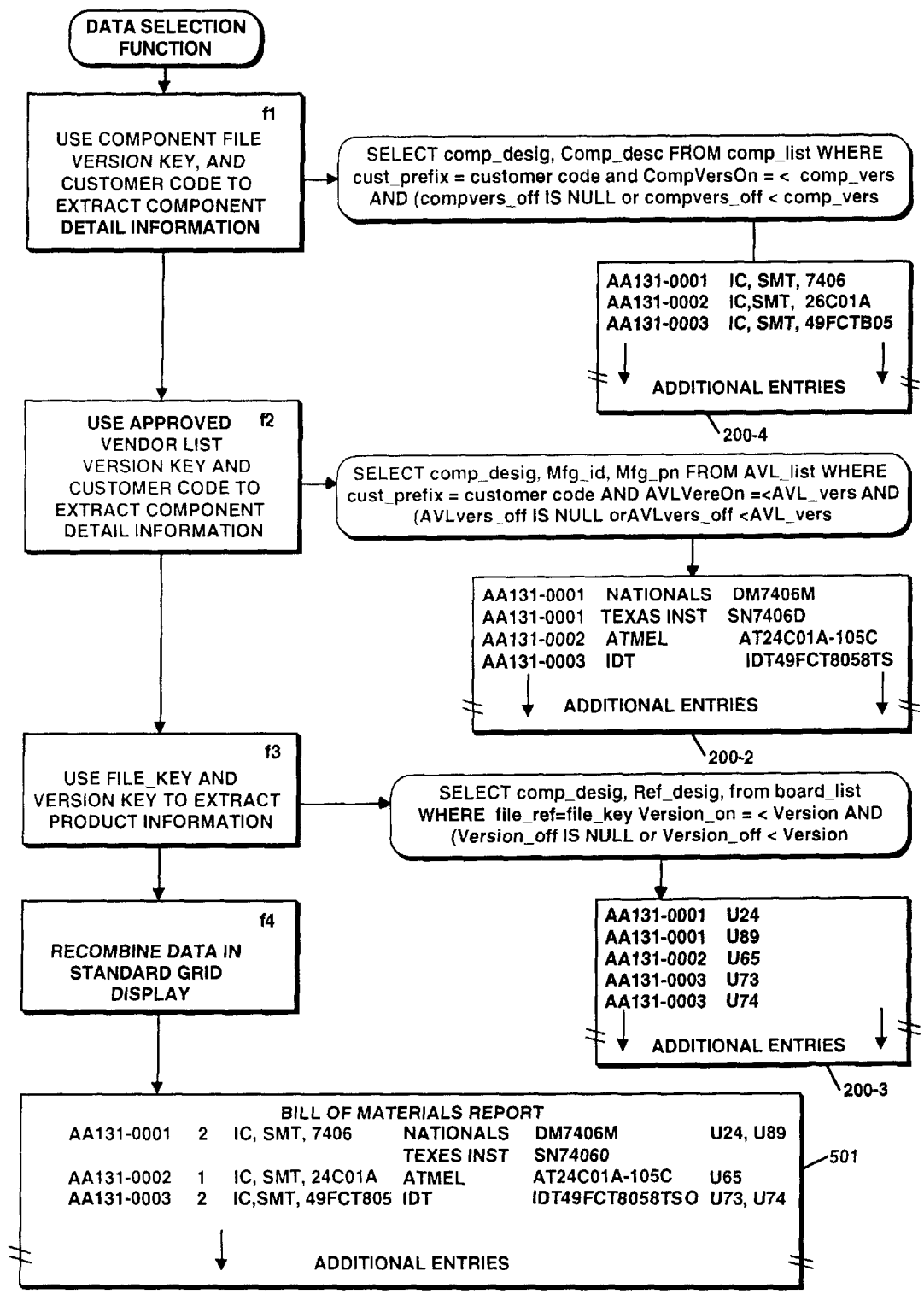
FIG. 3 illustrates in greater detail, the data selection component of FIG. 2.

Function f4 is used to recombine the extracted entry information of FIG. 3 in a standard Grid display image area 300-1 of memory 300 consisting of rows and columns. Each column contains different information such as component designation, Manufacture, Manufacturer's part number, while each row lists information related to each of the various components. This information is obtained from the database tables 200-2 through 200-4 by performing functions f1 through f3 and is located in the grid image area 300-1 of FIG. 3. The result as indicated is the generation of Bill of Materials report 501.

The selection process begins by generating an EXCEL type display grid consisting of a single column with one row defined for each of the component types that exist in the Bill of materials. Using this list, the system then extracts from the component table the related, and appropriate component descriptions from the component table and adds this information to new columns on the display. Following that operation, the system repeats this process to find all of the approved vendors and by placing the vendor name and component data in the appropriate column, and adding rows where multiple vendors are associated with a specific component type. Lastly, the system repeats this process by extracting all of the component locations where the components are used, adding additional rows to allow for a meaningful presentation of the data. During this process, the system also determines the quantity of each type of component and affixes this count in yet another column of the display.

DESCRIPTION OF OPERATION

With reference to FIGS. 1 through 6e, the operation of the system and method of the present will now be described. In order better appreciate the advantages of the present invention, it is desirable to consider in greater detail the aspects of the prior art method and database organization discussed above.

Conventional Method and Database Organization

Figure 5A:
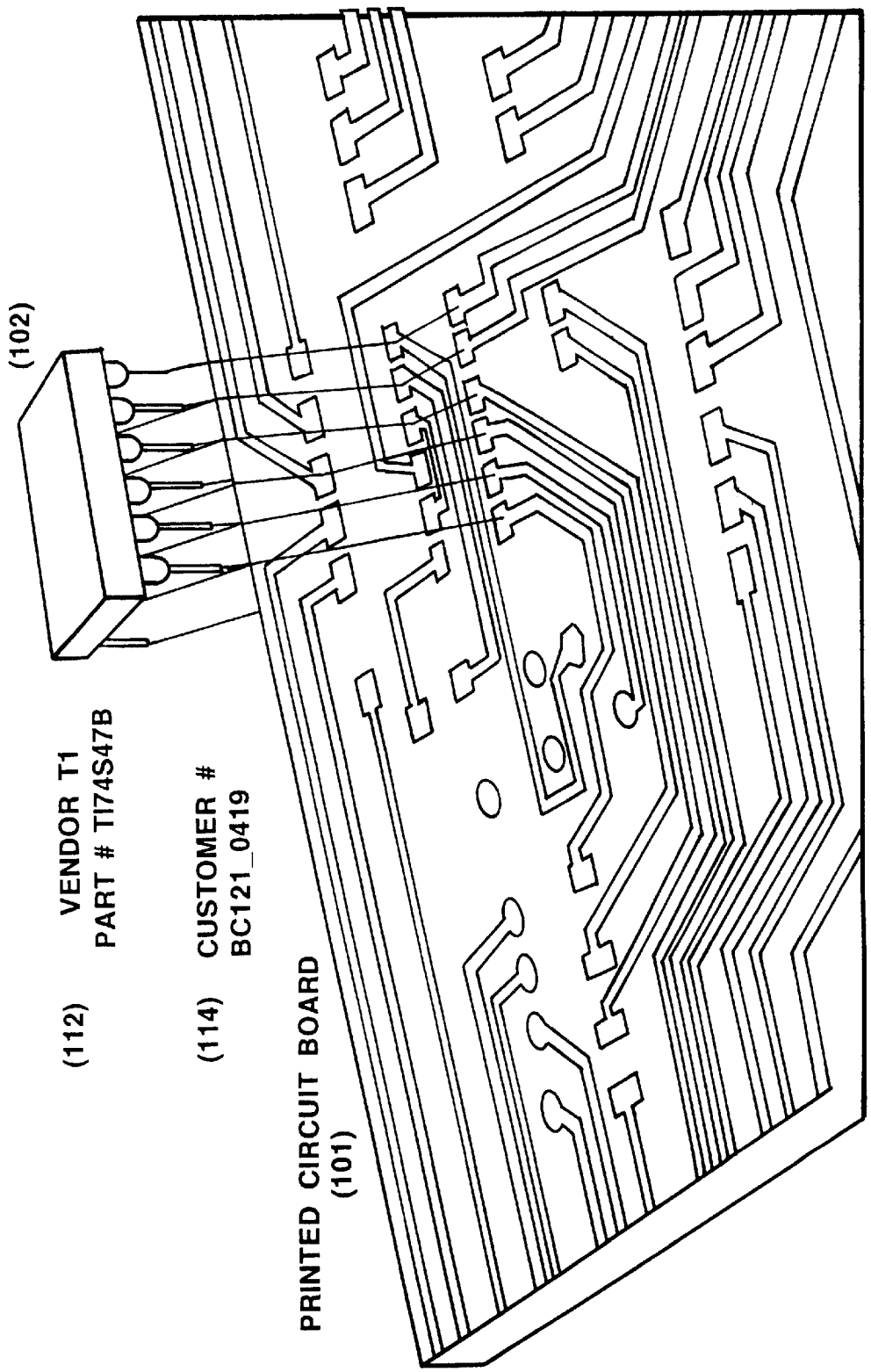

FIG. 5a depicts the assembly of a single component part on a printed circuit board. The installation or assembly process for board components consists of mounting or placing the various component parts onto the printed circuit board, such as the 74S74 integrated circuit part labeled 102 onto the printed circuit board labeled 101. The generic component name or description associated with the IC part is in location labeled 110 and the location on the printed circuit board where the IC part is to be mounted is defined by the symbol U1 noted in location U1 identified by label 110.

The various names or description associated with the IC part are designated by items 112 and 114. The item 112 is used to represent the name of the manufacturer and the manufacturer's part number for the 74S74 IC part. In the typical situation, there are several suppliers or sources for the same type of part, each source with their own part number designation. As indicated by item 114, the actual customer may also affix a part number to each component part. These numbers enable customers to track their own inventory material. The various pieces of information related to the assembly process of the IC part are shown in the table structure of FIG. 5b. This information was customarily developed from a single table data base structure such as illustrated in FIG. 5c. In many situations, the data is simply represented or maintained as a series of cells in a spreadsheet that can be graphically represented in the same manner as the data base table structure depicted in FIG. 5c. In rare instances, the information is represented in a dual data base structure such as depicted in FIGS. 5d and 5e. The table structure of FIG. 5d is used to represent the component description and approved vendor list information, whereas the table structure of FIG. 5e is used to represent the component placement data.

The bill of materials for the printed circuit board assembly is generally constructed to contain the information indicated by items 110, 112 and 114 in FIG. 5b for each component part to be used on the assembly (product). More specifically, the bill of materials document would contain the following information for each component part:

(1) The name of the component using a customer or internal designation that allows the component to be distinguishable from any other component used or received by the manufacturing organization. For example, the component name may be based on the customer's part number for that component part;

(2) A description of the component part in terms that define its physical or electronic attributes/characteristics. This information may appear on the surface of the component part;

(3) The physical location on the printed circuit board assembly where the component can be found. Reference locations are typically related to a design print or may be marked directly on the printed circuit board (e.g. U1 in FIG. 5a);

(4) The manufacturers of the component part (vendor) from which the board manufacturer may purchase the component part. Where there are multiple vendors approved as sources for the component part, multiple entries are required.

(5) The vendor designation for the component part that the manufacturer's purchasing department would use to purchase the part. Each vendor typically assigns its own part number designation.

An example of a simplest form of bill of materials document would contain the information stored in the table structure of FIG. 5c. The nature of the information shown in FIG. 5c is such that it has been most appropriate to maintain each of the information sources in three distinct tables within a database structure using the component part number as the primary key for accessing such tables. The three tables correspond to a Component Table, an Approved Vendor Table and a Product Table illustrated in FIGS. 5f through 5h.

As indicated, the Component Description Table of FIG. 5f provides a generic description of the component part. The table contains one entry for each customer component type. In order to allow this information to coexist with other bill of materials from various customers, all of the information received from a specific customer is placed information in the database with an additional field so that the component designation from unique customers can coexist in the database without conflict. This field, identified as the Customer Code field (Cust.) contains a unique code character to represent the actual company. For purposes of simplification the customer name can be stored as a code such as is presented in the prior art tables of FIGS. 5f through 5h. The assignment of a customer code in lieu of the full customer name allows for this same code prefix to be used on the actual component part or device designation. In this manner, components can be coded for quickly identifying the customer associated with a particular device. As indicated, the Approved Vendor Table of FIG. 5g specifies for each of the component designations, the vendor sources where the material can be obtained from and the part number used by the vendor to uniquely identify the component part. The Approved Vendor table contains one entry for each approved vendor and vendor part. The use of the customer code field allows for a multiplicity of companies to share the same data base table without concern for conflicting component part designations.

As indicated, the prior art Product Table of FIG. 5h specifies which component parts are to be placed on a particular printed circuit board assembly and where the component parts are located on such assembly. The table contains one entry for each printed circuit board assembly and an assembly reference designation. In order to allow the information from several products and customers to exist in the same database structure, additional fields are required to define the customer, (cust) as well as the specific product using these various components, (assembly), and (rev).

This product information is retained for the following reasons: (1) there can be numerous approved vendors for any given component entry, (2) there can be numerous locations on a single printed circuit board assembly where a specific component part is used, there is only one valid description for any given component part type and (3) it is desirable to retain available history for each change performed. When all of the above information is compiled from these tables, it resembles the sample bill of materials document illustrated in FIG. 5c (i.e., a composite of the data contained in the tables FIGS. 5d and 5e or FIGS. 5f, 5g and 5h). For each of these data base structures, and particularly, the product data base table, the manner in which data is updated is to recreate an entirely separate series of entries for each of the products to be placed in the system. This method would also apply to the Approved Vendor table and the Component Description table; however, the frequency of changes to these tables is such that there is less concern about the history of changes. As standard practice in the prior art, it is customary to simply replace information in the Component and Approved Vendor List tables without regard for any historical information record keeping. By contrast, the preferred embodiment, the of the present invention provides a historical record keeping feature.

Modifications to customer information can be received in several ways, the most common being by hand written document or fax. As depicted in FIG. 5j, the customer may simply communicate a change which has to recorded in some fashion in the database. FIG. 5k (a–c) illustrates another type of situation, where a customer announces a new product which is a simple modification to the existing product; and the customer elects to assign an entirely new product designation to such new product. This practice of utilizing totally different product designations for similar products is quite common in the industry since it allows clear distinction among products, (by designation rather than revision), support, and level of performance. In order to preserve the status of each product; a key consideration in maintaining older versions of the product, it is necessary to duplicate much of the data in the prior art database tables as new revisions, or similar products are introduced. FIG. 5l provides a comparison of the three products.

In the prior art, the method of updating product information while still retaining accessable historical information, was to copy the data from the database into an additional series of table entries and make the appropriate modifications. As can be seen in the table for revision E of product 020-005 of FIG. 5*l*, the data in this table is identical to the information in the table for revision D of the same product except for the single entry at ref. location U48 where the device type of that component has been modified.

In a similar manner, the data for revision A of product 020-0031, defined as being similar to revision E of product 020-005, results in the generation of still another series of data containing only a few modifications to the entries contained in the original information entries pertaining to revision E of the product 020-005. More specifically, as indicated in FIG. 5*l*, the entries for this product contained in the designated table differ from the data entries for revision E of the product 020-005 by the replacement of the transformer devices (T1000-T1008)in nine table entry locations.

As previously stated, the net effect is that when using the prior art method, it becomes necessary to make a complete copy of all other entries in the database entries for revision D of product 020-0005 in order to create the product information for revision E of product 020-0005. Similarly, it was necessary to make a complete copy of all of the database entries for product 020-0031 revision A even though the product utilizes a majority of the same database items as other products being provided by the same customer.

It will be appreciated that while this example uses a some number of database entries to illustrates a common situation; in practice, the number of entries required for a typical product are much larger than illustrated. For example, the number of entries for a typical product would be on the order of several hundred and the number of product identification changes would be on the order of 10 to 30. Changes to the Approved Vendor list would also occur during the life of a product but the frequency of such changes would be less than the changes for the product. In addition, changes to the component descriptions would occur less frequently than the product changes. As indicated, examples of these lists are illustrated in the tables of FIGS. 5*f* and 5*g*. In the prior art method, changes to these database tables were not normally preserved and the common approach to historical analysis was to rely on source change documents. Because the primary need today is in the preservation of the Bill of Materials information, using the prior art method results in a very significant amount of duplication of information in the database.

In dealing with the electronic assembly manufacturing process, customers can provide data in a variety of formats to suit their own business needs. However, this requires that the manufacturing organization provide some means for processing the continuous variety of information provided by customers. In the prior art method, sets of procedures were established for handling customer changes to the Product Table, Approved Vendor Table and Component Table. Examples of such procedures are set forth in the tables below.

| Procedures for New Product Changes | | |
| --- | --- | --- |
| Change Information | Product Change | Revision Change |
| Customer provides information for a new product | New name | New Revision |
| Customer communicates a number of changes to the existing product using some form of communication | None (same name) | None (same revision) |

| -continued | | |
| --- | --- | --- |
| Procedures for New Product Changes | | |
| Change Information | Product Change | Revision Change |
| Same as above | None | New revision designation |
| Same as above | New name assigned | No impact when name changes |
| Customer communicates a new bill of materials list for a revised product, in electronic or manual form. | None (Same name) | New revision |
| Same as above | New name | No impact when name changes |
| Customer informs manufacturer that previous product will now be renamed using same bill of materials | New Name | No impact when name changes |

| Procedures for Approved Vendor and Component Description Changes | |
| --- | --- |
| Change Information | Impact of change |
| Customer communicates changes to approved vendor list | Change is made directly to the system with no method for determining change history |
| Same as above | Change is recorded in a method that allows for full recovery of previous state. |
| Customer provides new electronic listing of Approved vendors and component description changes | Change is made directly to the system with no method for determining change history |
| Same as above | Change is recorded in a method that allows for full recovery of previous state. |

Method and Database Organization of Preferred Embodiment

The system and method of the present invention eliminates the above disadvantages of the prior art method. The method used by the system of the present invention provides Product Directory Index Table structure 200-1 that serves as an index for converting each product name entered into the system by the user or operator into a file key value (file__key) and version number value (Version). The file key value servers as a pointer to a common series of information entries and the version number serves to identify the proper information.

FIG. 6*a* illustrates a simple index structure for the three products discussed above in connection with FIG. 5*k* (a–c) and provides all of the required information for those products. FIGS. 6*b* and 6*c* illustrate examples of the Approved Vendor table 200-2 and Component table 200-4 wherein all of the information provided in the prior art method has been entered into the locations of the tables in accordance with the teachings of the present invention. FIG. 6*d* illustrates an example of a section of the Product table 200-3 wherein the information provided in the above prior art method has been entered into the locations of the product table structure according to the teachings of the present invention.

Database Operational Example

With reference to the flowchart of FIG. 4, as indicated in block 101, the operator invokes the data retrieval software that has been loaded from the network server 10 into the memory of each of the client systems of FIG. 1 as illustrated in FIG. 2. As previously stated, the loading procedure can be deemed similar to the procedures for installing any application program in a network environment. Next, the operator enters a product name into the system via the client system's selection menu facility component 210-1. As indicated in block 102, this results in the system software components accessing product directory index table structure 200-1 and the display of the menu 302 by menu facility component 210-1.

As indicated in block 104, using the mouse device 304 of FIG. 1, the operator next selects the product to be processed by the system that corresponds to the highlighted entry of menu 302. In addition to selecting a revision from the displayed list, the menu also enables the operator to enter a revision designation, (when entering new information), or selecting an existing revision for the purposes of displaying, or printing, the information associated with a specific product entry.

Next, as indicated in block 106, the system software selection component 210-1 determines the control key values from the information obtained from Product Directory index table 210-1. This is accomplished by the software selection component 210-1 by matching the product name and revision selected in the index entry with the corresponding file key and version designation. For the selection of Component information and Approved Vendor List data, the system software selection component 210-1 matches the customer prefix code contained in the product index entry and uses this information to determine the appropriate entries in the Approved Vendor List Table and the Component table. This prefix code is common to both of these tables.

This results in the indicated four key values (i.e., AVL Version key, Product File key, Product Version key and Component Version key) being applied as inputs to the data selection component 210-3. The data selection component 210-3 performs functions f1 through f3 of FIG. 3 that results in the extraction of the appropriate data from the database tables 200-2 through 200-4 of FIG. 2 (i.e., block 108). As indicated in block 110, the data selection component 210-3 constructs the bill of materials information in the image area 301 of memory 300 of FIG. 2 which results in the generation of bill of materials report 501. This information is also displayed to the operator for viewing or printout on the system.

Considering the above in greater detail relative to Product Table 200-2, as mentioned, the selection of the product from the product directory index table structure 200-1 of FIG. 6a provides a key value and version number value. In addition, the index information from the product directory index table 200-1 also provides the customer code value which is then used to determine the portion of the component and Approved Vendor List data to be extracted from tables 200-2 and 200-4 of FIGS. 6b and 6c by the system. It should be noted that for normal extraction of the Approved Vendor and Component data information, the system always seeks out the most recent value for a given component (i.e., latest ON value). This always translates to the equivalent of having searched all entries with an OFF value of NULL. For example, the selection of a product such as 020-0031 in the product directory index table 200-1 would provide a customer code of AA, a file key value of 15 and a version number of 2. The system would then use that value to determine the most recent version of the Approved Vendor and Component data. In both of these examples, as shown in FIG. 6a, the version number value extracted from the table would be 2.

To extract the appropriate product data, the data selection component 210-3 extracts the appropriate data from the Product table of FIG. 6d based on the following criteria: WHERE the key value in the table entry is equal to the defined file key AND the contents of the entry's ON field value is less than or equal to the version number value AND the entry's OFF field value is either NULL or is less than the version number value of the selected revision.

With reference to FIG. 6d, the extraction process performed by data selection component 210-3 proceeds as follows. Component 210-3 rejects record numbers 15.3, 15.5, 15.7, 15.9, 15.11, 15,13, 15,15, 15.17, and 15. because their OFF value is equal to the value of the version number selected (i.e., 2). Component 210-3 rejects record 15.30 because it has an OFF value less than the version number selected. Lastly, component 210-3 rejects all other data base values because they have a file key value other than what was selected (i.e., 15). The result of the extraction process performed by component 210-3 provides the series of record entries illustrated in FIG. 6e.

Historical Information Retrieval

From FIG. 6a, it will be noted that a user is able to access historical data pertaining to two versions of a specific product (i.e., 020-005) contained in the product table. Also, a user may obtain historical information pertaining to component designations as well as approved vendors. Over a period of time, new entries are added to the product directory Index table along with accompanying data table entries, the historical aspects of such additions will be automatically preserved. The records pertaining to the additions entered over the time interval specified in the date column of table 200-1 are available for access by the user. For example, a user may want to compare the differences in versions relative to the approved vendor list table entries, component description table entries or the product table entries.

From the above, it is seen how the method and database organization of the present invention is able to provide an efficient way of managing objects while still preserving historical changes made to such objects. The invention accomplishes this by providing a specific directory index table organization and selection condition values in the data entries of each table. This organization eliminates the number of duplicate entries contained within the database table structures. The database structure is designed for situations where a specific set of key values and associated information is represented in a database structure where periodic changes occur to a small portion of the data. Through the use of an indexing scheme as described herein the preservation of all prior revisions of information can be maintained with a minimum of data overhead. Through the simple selection of an index entry, which will then define the appropriate version designations, the data selection component, as described, will serve to correctly extract the appropriate information.

It will be obvious that many changes may be made to the preferred embodiment of the present invention without departing from its basic teachings. For example, different data forms, coding and table organizations may be used. The teachings of the invention are also applicable to other applications, such as training and certification database, where it becomes important to provide an efficient way of preserving historical information record.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of organizing a user accessible database for minimizing the amount of duplicate information stored in tables contained therein and used for generating bill of materials documents for manufacturing a number of board assembly products, the method comprising the steps of:

(a) including as a first table, a product directory index table structure for storing a number of index value entries coded in a predetermined manner that represent all of board assembly products being currently manufactured, each index value entry containing a first type of key values to be used as a filtering mechanism in extracting data entries from other tables contained in the database containing information related to a particular board assembly product and for designating points within the database tables where entries were added or deleted;

(b) including as the other tables in the database, data table structures for storing data entries containing different assembly board product related information required in generating the bill of materials documents used in manufacturing the board assembly products, each entry containing a second type of key values for defining data selection criteria conditions to be used in extracting entries utilized by a particular board assembly product;

(c) including a first data retrieval component in the database, the first component for accessing the product index table structure to present the user with all of the entries associated with a particular board product and for generating the first type of key values in response to a user product selection from the entries presented; and, (d) including a second data retrieval component in the database, the second component for accessing data entries contained in the number of other tables of the database, the second component being operative in response the first type of key values to search each of the entries in the other tables for extracting as a function of criteria conditions defined by the second type of key values contained in each table data entry, only those data entries identified as being required for the generation of a bill of materials document for the selected board assembly product.

2. The method of claim 1 wherein the first type of key values contained in each index entry includes a file key value coded for defining the specific to define a group of data entries specific to a particular board assembly product and a file version value coded to define a point in the group of data entries of the other tables where data was added or deleted.

3. The method of claim 1 wherein the second type of key values contained each data entry includes an ON field value initially set to predetermined value for identifying a version of the board product for which a particular data entry was added to the database and an OFF field value set to a predetermined value for identifying those versions of a board product for which the data entry is not used.

4. The method of claim 3 wherein the ON and OFF field values are used in conjunction with the file version value for defining the data selection criteria conditions according to the file version value contained in the selected product index entry.

5. The method of claim 3 wherein the ON field and OFF field values of a previously entered data entry are modified in a predetermined manner each time a new version of a board product is added to the database that utilizes the data entry.

6. The method of claim 5 wherein the predetermined manner includes maintaining the ON field the same value and setting the OFF field to a value designating a next version of the board product when the previously entered data entry is not being used in the next version.

7. The method of claim 6 wherein the ON field s is set to the value designating the next version of the board product and the OFF field is set to a NULL value for each new data entry entered into the database tables.

8. The method of claim 1 wherein all of the entries presented to the user correspond to a list of entries for the selected board product indicating all of the revisions pertaining to the product.

9. The method of claim 2 wherein the second data retrieval component in extracting data entries executes a predetermined selection algorithm wherein for a board product having a file key value equal to "k" and a file version number value equal to "n", the second data retrieval component only extracts data entries that have file key values equal to "k" and ON field values equal to "n" and OFF field values less than "n" or equal to a NULL value where both "k" and "n" are whole integers.

10. The method of claim 1 wherein the database is accessible through a number of client systems, each client system being operatively coupled to the database and having a copy of the first and second data retrieval components installed within the client system for generating bill of materials documents for board assembly products.

11. The method of claim 1 wherein the product directory index table structure includes index values used by the other table structures and wherein the other table structures include a product table for storing data entries pertaining to the board product, a component description table for storing data entries pertaining to component parts utilized in manufacturing the board products and an approved vendors table for storing data entries pertaining to vendor suppliers of the component parts.

12. The method of claim 11 wherein the index values of the product directory index table structure are included within a product table index section, a component index section and an approved vendors index section, each of the index entries of the component index section containing a first predetermined file key value for isolating the component index entries from the entries of the product table index section, each of the index entries of the approved vendors index section containing a second predetermined file key value for isolating the vendor index entries from all other index entries and each of the index entries of the component and approved vendors index sections further including a customer code value for use as a primary key by the second data retrieval component in accessing all of the data entries contained in the component and vendor tables.

13. The method of claim 12 wherein the second data retrieval component extracts predetermined data from a group of data entries of the component description table defined by a component version number value contained in the user selected component table index entry utilizing a selection criteria wherein each data entry contains a customer code that equals a customer prefix value selected by the user and the component data entry ON field value equals or is less than the selected component version number value and the component data entry OFF field equals a NULL value or is less than the selected component version number value.

14. The method of claim 12 wherein the second data retrieval component extracts predetermined data from a group of data entries of the approved vendors table defined by an approved vendors list version number value contained in the user selected approved vendors list table index entry utilizing a selection criteria wherein each data entry contains a customer code that equals a customer prefix value selected by the user and the approved vendors data entry ON field value equals or is less than the selected approved vendors list version number value and the approved vendors list data entry OFF field equals a NULL value or is less than the selected approved vendors list version number value.

15. A database system organized for minimizing the amount of duplicate information stored in tables contained in a database and for generating bill of materials documents in response to user requests used in manufacturing a number of board assembly products, the database system comprising:

(a) a product directory index table structure for storing a number of index value entries coded in a predetermined manner that represent all of board assembly products being currently manufactured, each index value entry containing a first type of key values to be used as a filtering mechanism in extracting data entries from the database containing information related to a particular board assembly product and for designating points within the database tables where data entries were added or deleted;

(b) a number of data table structures for storing data entries containing different assembly board items of the information required in generating the bill of materials documents used in manufacturing the board assembly products, each data entry containing a second type of key values for defining data selection criteria conditions to be used in extracting entries utilized for generating the bill of materials document for a particular board assembly product;

(c) a first data retrieval component for accessing the product index table structure to present the user with all of the entries associated with a particular board product and for generating the first type of key values in response to a user product selection from the entries presented; and, (d) a second data retrieval component operatively coupled to the first data retrieval component and to the number of data table structures, the second component being operative in response the first type of key values applied by the first data retrieval component to search each of the entries in the data tables for extracting as a function of criteria conditions defined by the second type of key values contained in each data table entry, only those data entries identified as being required for the generation of a bill of materials document for the selected board assembly product.

16. The system of claim 15 wherein the first type of key values contained in each index entry includes a file key value coded for defining the specific to define a group of data entries specific to a particular board assembly product and a file version value coded to define a point in the group of data entries of the data tables where data has been added or deleted.

17. The system of claim 16 wherein the second data retrieval component in extracting data entries executes a predetermined selection algorithm wherein for a board product having a file key value equal to "k" and a file version number value equal to "n", the second data retrieval component only extracts data entries that have file key values equal to "k" and ON field values equal to "n" and OFF field values less than "n" or equal to a NULL value where both "k" and "n" are whole integers.

18. The system of claim 15 wherein the second type of key values contained each data entry includes an ON field value initially set to predetermined value for identifying a version of the board product for which a particular data entry was added to the database and an OFF field value set to a predetermined value for identifying those versions of a board product for which the data entry is not used.

19. The system of claim 18 wherein the ON and OFF field values are used in conjunction with the file version value for defining the data selection criteria conditions according to the file version value contained in the selected product index entry.

20. The system of claim 18 wherein the ON field and OFF field values of a previously entered data entry are modified in a predetermined manner each time a new version of a board product is added to the database that utilizes the data entry.

21. The system of claim 20 wherein the predetermined manner includes maintaining the ON field the same value and setting the OFF field to a value designating a next version of the board product when the previously entered data entry is not being used in the next version.

22. The system of claim 21 wherein the ON field s is set to the value designating the next version of the board product and the OFF field is set to a NULL value for each new data entry entered into the database data tables.

23. The system of claim 15 wherein all of the entries presented to the user correspond to a list of entries for the selected board product indicating all of the revisions pertaining to the board product.

24. The system of claim 15 wherein the database system further includes a number of client systems, each client system being operatively coupled to the database and having a copy of the first and second data retrieval components installed within the client system for generating bill of materials documents for board assembly products in response to user requests.

25. The system of claim 15 wherein the product directory index table structure includes a number of sections for storing index values pertaining to the number of data tables and wherein the data table structures include a product table for storing data entries containing items pertaining to the board product, a component description table for storing data entries containing items pertaining to component parts utilized in manufacturing the board products and an approved vendors list table for storing data entries containing items pertaining to vendor suppliers of the component parts.

26. The system of claim 25 wherein the sections of the product directory index table structure include a product table index section, a component index section and an approved vendors index section, each of the index entries of the component index section containing a first predetermined file key value for isolating the component index entries from the entries of the product table index section, each of the index entries of the approved vendors list index section containing a second predetermined file key value for isolating the vendor index entries from all other index entries and each of the index entries of the component and approved vendors list index sections further including a customer code value for use as a primary key by the second data retrieval component in accessing all of the data entries contained in the component and vendor tables.

27. The system of claim 26 wherein the second data retrieval component includes a first function for extracting predetermined data items from a group of data entries of the component description table defined by a component version number value contained in the user selected component table index entry utilizing a selection criteria wherein each data entry selected contains a customer code that equals a customer prefix value selected by the user and the component data entry ON field value equals or is less than the selected component version number value and the component data entry OFF field equals a NULL value or is less than the selected component version number value.

28. The system of claim 26 wherein the second data retrieval component further includes a second function for extracting predetermined data items from a group of data entries of the approved vendors list table defined by an approved vendors list version number value contained in the user selected approved vendors list table index entry utilizing a selection criteria wherein each data entry selected contains a customer code that equals a customer prefix value selected by the user and the approved vendors data entry ON field value equals or is less than the selected approved vendors list version number value and the approved vendors list data entry OFF field equals a NULL value or is less than the selected approved vendors list version number value.

29. A software database system comprising data retrieval software and a database stored on a storage medium for use in minimizing the amount of duplicate information stored in the database and for generating bill of materials documents in response to user requests used in manufacturing a number of board assembly products, the database system comprising:

(a) a product directory index table structure for storing a number of index value entries coded in a predetermined manner that represent all of board assembly products being currently manufactured, each index value entry containing a first type of key values to be used as a filtering mechanism in extracting data entries from the database containing information related to a particular board assembly product and for designating points within the database tables where data entries were added or deleted;

(b) a number of data table structures included in the database for storing data entries containing different assembly board items of the information required in generating the bill of materials documents used in manufacturing the board assembly products, each data entry containing a second type of key values for defining data selection criteria conditions to be used in extracting entries utilized for generating the bill of materials document for a particular board assembly product;

(c) a menu selection component included in the data retrieval software for accessing the product index table structure to present the user with a display containing all of the entries associated with a particular board product and for generating the first type of key values in response to a user product selection from the displayed entries; and, (d) a data selection component included in the data retrieval software operative in response the first type of key values applied by the menu selection component to search each of the entries in the data tables for extracting as a function of criteria conditions defined by the second type of key values contained in each data table entry, only those data entries identified as being required for the generation of a bill of materials document for the selected board assembly product.

30. A method of organizing a user accessible database for minimizing the amount of duplicate information stored in tables contained therein, and used for generating documents pertaining for a number of different objects, the method comprising the steps of:

(a) including as a first table, a directory index table structure for storing a number of index value entries coded in a predetermined manner that all of the objects currently being managed, each index value entry containing a first type of key values to be used as a filtering mechanism in extracting data entries from other tables contained in the database containing information related to a particular object and for designating points within the database tables where entries were added or deleted;

(b) including as the other tables in the database, data table structures for storing data entries containing different object related information required in generating the documents used in managing the board assembly object, each entry containing a second type of key values for defining data selection criteria conditions to be used in extracting entries utilized by a particular object;

(c) including a first data retrieval component in the database, the first component for accessing the directory index table structure to present the user with all of the entries associated with a particular object and for generating the first type of key values in response to a user selection from the entries presented; and, (d) including a second data retrieval component in the database, the second component for accessing data entries contained in the number of other tables of the database, the second component being operative in response the first type of key values to search each of the entries in the other tables for extracting as a function of criteria conditions defined by the second type of key values contained in each table data entry, only those data entries identified as being required for the generation of a bill of materials document for the selected object.

* * * * *